US008650265B2

(12) United States Patent
Broder et al.

(10) Patent No.: US 8,650,265 B2
(45) Date of Patent: Feb. 11, 2014

(54) METHODS OF DYNAMICALLY CREATING PERSONALIZED INTERNET ADVERTISEMENTS BASED ON ADVERTISER INPUT

(75) Inventors: Andrei Zary Broder, Menlo Park, CA (US); Marcus Felipe Fontoura, Los Gatos, CA (US); Vanja Josifovski, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 739 days.

(21) Appl. No.: 11/708,396

(22) Filed: Feb. 20, 2007

(65) Prior Publication Data

US 2008/0201220 A1    Aug. 21, 2008

(51) Int. Cl.
G06F 15/16 (2006.01)
G06Q 30/00 (2012.01)
H04N 7/10 (2006.01)

(52) U.S. Cl.
USPC ........................... 709/218; 705/14.42; 725/32

(58) Field of Classification Search
USPC ........................................................ 709/218
See application file for complete search history.

(56) References Cited

U.S. PATENT DOCUMENTS

| | | | |
|---|---|---|---|
| 6,401,075 B1 | 6/2002 | Mason et al. | |
| 6,446,061 B1 | 9/2002 | Doerre et al. | |
| 6,484,148 B1 * | 11/2002 | Boyd | 705/14.64 |
| 6,711,585 B1 | 3/2004 | Copperman et al. | |
| 6,712,702 B2 * | 3/2004 | Goldberg et al. | 463/42 |
| 6,785,671 B1 | 8/2004 | Bailey | |
| 7,003,506 B1 | 2/2006 | Fisk | |
| 7,062,510 B1 * | 6/2006 | Eldering | 1/1 |
| 7,136,875 B2 | 11/2006 | Anderson et al. | |
| 7,162,480 B2 | 1/2007 | Vishik | |
| 7,299,194 B1 | 11/2007 | Manganaris et al. | |
| 7,447,677 B2 | 11/2008 | Milligan et al. | |
| 7,496,943 B1 * | 2/2009 | Goldberg et al. | 725/22 |
| 2001/0034762 A1 * | 10/2001 | Jacobs et al. | 709/204 |
| 2001/0044837 A1 | 11/2001 | Talib et al. | |
| 2002/0078192 A1 * | 6/2002 | Kopsell et al. | 709/223 |
| 2002/0082923 A1 | 6/2002 | Merriman et al. | |

(Continued)

FOREIGN PATENT DOCUMENTS

KR    2006-0103034 A    9/2006

OTHER PUBLICATIONS

U.S. Appl. No. 11/708,272, filed Feb. 20, 2007, Broder, Office Action dated Jan. 5, 2012.

*Primary Examiner* — Lynn Feild
*Assistant Examiner* — James Edwards
(74) *Attorney, Agent, or Firm* — Brinks Gilson & Lione

(57) ABSTRACT

The World Wide Web portion of the Internet is largely supported by advertising. To deliver the most effective advertising, a system for dynamically creating customized advertisements is introduced. The behavior and any demographic information known about web viewers is used to select an advertising template that will be used to create an advertisement. The advertisement template comprises an incomplete advertisement with certain missing information along with identifiers for functions that may be used to complete the advertisement. In one embodiment, the functions may specify how the advertiser associated with the advertisement template may be contacted with the demographic information known about the user in order to fill in the missing portions of advertisement template. For example, the advertisement may concern flights to Hawaii and the advertiser may fill in the price of a flight to Hawaii based upon being provided with the user's location. The complete advertisement may then be displayed to the user.

20 Claims, 3 Drawing Sheets

(56) References Cited

U.S. PATENT DOCUMENTS

| | | |
|---|---|---|
| 2002/0107735 A1 | 8/2002 | Henkin |
| 2002/0123912 A1 | 9/2002 | Subramanian |
| 2002/0161648 A1 | 10/2002 | Mason et al. |
| 2003/0040960 A1 | 2/2003 | Eckmann |
| 2003/0046148 A1* | 3/2003 | Rizzi et al. .................. 705/14 |
| 2003/0065768 A1 | 4/2003 | Malik |
| 2003/0101095 A1 | 5/2003 | Suzuki |
| 2004/0015401 A1 | 1/2004 | Lee |
| 2004/0059708 A1 | 3/2004 | Dean et al. |
| 2004/0158858 A1 | 8/2004 | Paxton |
| 2004/0181525 A1 | 9/2004 | Itzhak et al. |
| 2004/0243466 A1 | 12/2004 | Trzybinski et al. |
| 2004/0267725 A1 | 12/2004 | Harik |
| 2005/0033641 A1 | 2/2005 | Jha et al. |
| 2005/0033771 A1 | 2/2005 | Schmitter et al. |
| 2005/0149395 A1 | 7/2005 | Henkin et al. |
| 2005/0165638 A1 | 7/2005 | Piller |
| 2005/0216448 A1 | 9/2005 | Talib et al. |
| 2005/0267872 A1 | 12/2005 | Galai et al. |
| 2006/0026067 A1* | 2/2006 | Nicholas et al. ............. 705/14 |
| 2006/0122994 A1 | 6/2006 | Kapur et al. |
| 2006/0229942 A1 | 10/2006 | Miller |
| 2006/0242017 A1 | 10/2006 | Libes et al. |
| 2006/0287920 A1 | 12/2006 | Perkins et al. |
| 2007/0038516 A1* | 2/2007 | Apple et al. ................... 705/14 |
| 2007/0067297 A1* | 3/2007 | Kublickis ........................ 707/9 |
| 2007/0073758 A1 | 3/2007 | Perry et al. |
| 2007/0174255 A1 | 7/2007 | Sravanapudi et al. |
| 2007/0198341 A1 | 8/2007 | Park |
| 2007/0239530 A1 | 10/2007 | Datar |
| 2007/0276926 A1 | 11/2007 | LaJoie et al. |
| 2007/0288454 A1 | 12/2007 | Bolivar |
| 2008/0010142 A1* | 1/2008 | O'Brien et al. ............... 705/14 |
| 2008/0040175 A1* | 2/2008 | Dellovo ........................... 705/7 |
| 2008/0046314 A1* | 2/2008 | Chung et al. .................. 705/14 |
| 2008/0065624 A1 | 3/2008 | Sun et al. |
| 2008/0086372 A1 | 4/2008 | Madhavan |
| 2008/0086382 A1 | 4/2008 | Ur |
| 2008/0126205 A1* | 5/2008 | Evans et al. ................... 705/14 |
| 2008/0140591 A1 | 6/2008 | Agarwal et al. |
| 2008/0294577 A1 | 11/2008 | Agarwal |
| 2008/0313142 A1 | 12/2008 | Wang et al. |
| 2011/0214046 A1* | 9/2011 | Haberman et al. ........... 715/202 |
| 2013/0232099 A1* | 9/2013 | Elbaz et al. ................... 706/46 |

* cited by examiner

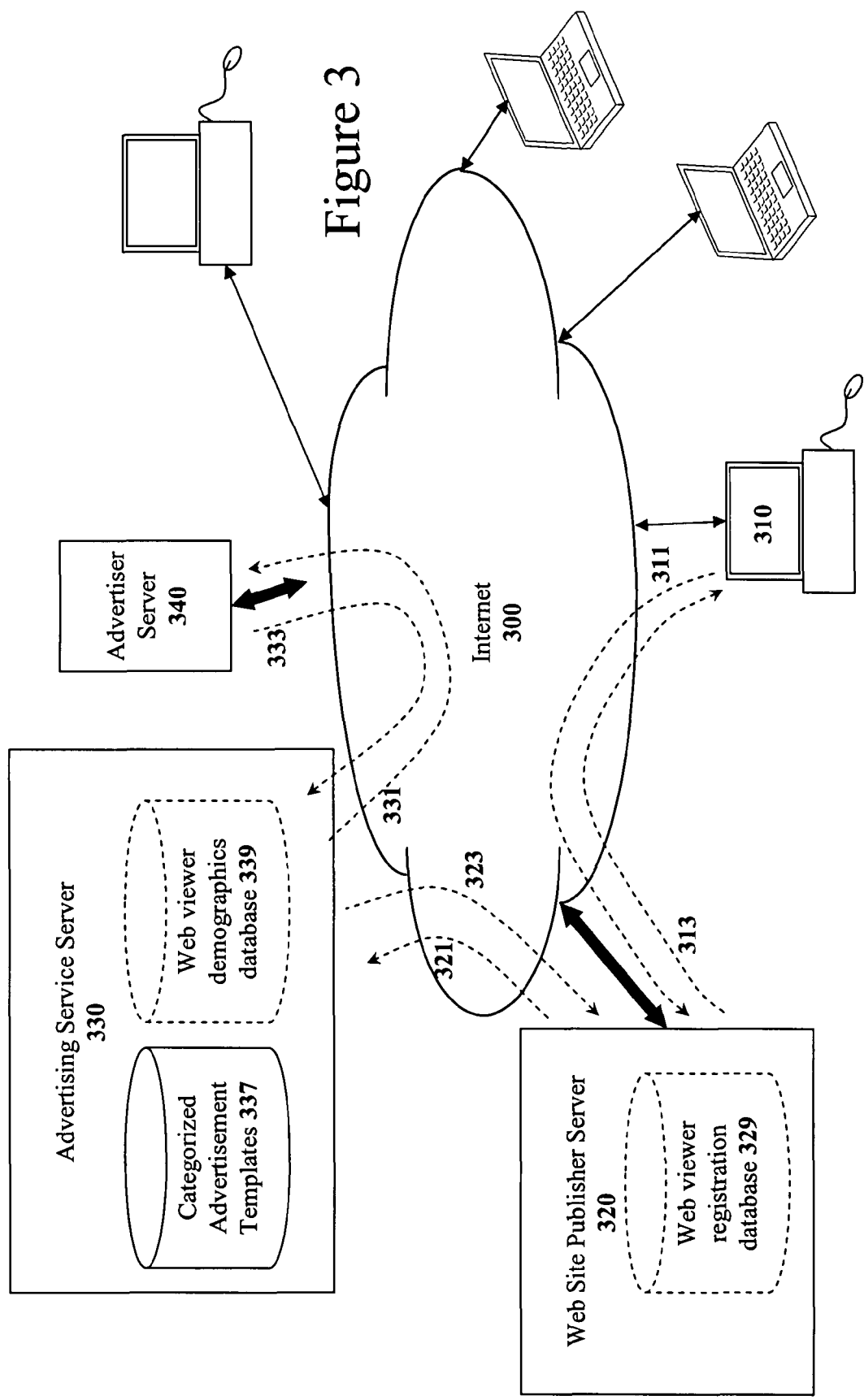

METHODS OF DYNAMICALLY CREATING PERSONALIZED INTERNET ADVERTISEMENTS BASED ON ADVERTISER INPUT

FIELD OF THE INVENTION

The present invention relates to the field of Internet advertising systems. In particular the present invention discloses techniques for dynamically generating and displaying advertisements that are customized to the advertisement context and personalized for the advertisement viewer.

BACKGROUND OF THE INVENTION

The global Internet has become a mass media on par with radio and television. And just like radio and television content, Internet content is largely supported by advertising dollars. The main advertising support portion of the Internet is the "World Wide Web" that display HyperText Mark-Up Language (HTML) documents distributed using the HyperText Transport Protocol (HTTP). Two of the most common types of advertisements on the World Wide Web are banner advertisements and text link advertisements. Banner advertisements are generally images that are displayed to the viewer of a World Wide Web page. Text link advertisements are generally short segments of text that are linked to the advertiser's Web site.

With any advertising-supported business model, there needs to be reliable metrics for assigning monetary value to the advertising. Radio and television advertising use ratings services that assess how many people are listening to a particular radio program or watching a particular television program in order assign a monetary value to advertising on the respective program. Radio and television programs with larger listening or viewing audiences are assigned larger monetary values for advertising.

With Internet banner type advertisements, a similar metric may be used. For example, the metric may be the number of times that the particular Internet banner advertisement is displayed to people browsing the Web site. However, due to the ability to easily detect how a web viewer interacts with an Internet advertisement, the Internet advertising world has increasingly moved to a pay for performance model wherein advertisers wish to only pay for advertisements that generate a tangible benefit. For example, many Internet advertisers wish to buy advertisements on a "pay per click" (PPC) basis. With such an arrangement, the advertiser only pays for advertising when a web viewer "clicks" on the advertisement. These types of transactions are known as 'click through' transactions since the web viewer 'clicks through' the advertisement link to see the advertiser's Web site. A click-through clearly has value to the advertiser since an interested web viewer has indicated a desire to see the advertiser's Web site and is subsequently presented with the advertiser's Web site.

In order to run advertising-supported Web sites that run on a pay per click model, the web site advertisements must attract web viewer clicks. Thus, web publishers and web advertisers have developed simplistic systems of attempting to match appropriate web site advertisements to the Web viewers. For example, some advertising supported web sites use simple matching algorithms that attempt to select the most appropriate advertisements for a particular web site. Although the simple matching systems have helped, it would be very desirable to create even more customized advertisements in order to attract web viewers to the advertisements.

SUMMARY OF THE INVENTION

The present invention introduces methods for dynamically creating customized advertisements to users of electronic media such the World Wide Web. In the system of the present invention, the user's behavior and any demographic information are used to select an advertising template that will be used to create an advertisement for the user. The advertisement template comprises an incomplete advertisement with certain missing information along with identifiers for functions that may be used to complete the advertisement. In the context of a web browser that is browsing the World Wide Web, the system may use features from the web pages accessed by the user and demographic information about the user such as cookies stored on that users computer and the user's Internet Protocol address.

Once an advertisement template has been selected then identified functions may be used to fill in the advertisement template. In one embodiment, the functions may specify how the advertiser associated with the advertisement template may be contacted with the demographic information known about the user in order to fill in the missing portions of advertisement template. For example, the advertisement may concern flights to Hawaii and the advertiser may fill in the price of a flight to Hawaii based upon being provided with the user's location. The complete advertisement may then be displayed to the user.

Other objects, features, and advantages of present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which:

FIG. 3 illustrates a conceptual diagram that illustrates the communication between various computer systems when the customized Internet advertisement system of the present invention.

DETAILED DESCRIPTION

Methods for dynamically creating customized Internet-based advertisements are disclosed. In the following description, for purposes of explanation, specific nomenclature is set forth to provide a thorough understanding of the present invention. However, it will be apparent to one skilled in the art that these specific details are not required in order to practice the present invention. Furthermore, although the present invention is mainly described with reference to the World Wide Web and the HyperText Transport Protocol (HTTP), the same techniques can easily be applied to other types of Internet advertising.

Advertising Supported World Wide Web Sites

The World Wide Web portion of the global Internet has become a mass media that largely operates using advertiser supported Web sites. Specifically, publishers provide interesting content that attracts Web site viewers. To compensate the publisher for creating the interesting content, the publisher intersperses paid advertisements into the Web pages of the Web site. Some Internet Web site advertisements are banner advertisements that consist of an advertiser-supplied image or animation that is displayed to the viewer of the Web page. Other Internet Web site advertisements are text link advertisements that are generally short segments of text that are linked to the advertiser's Web site.

Figure 1:
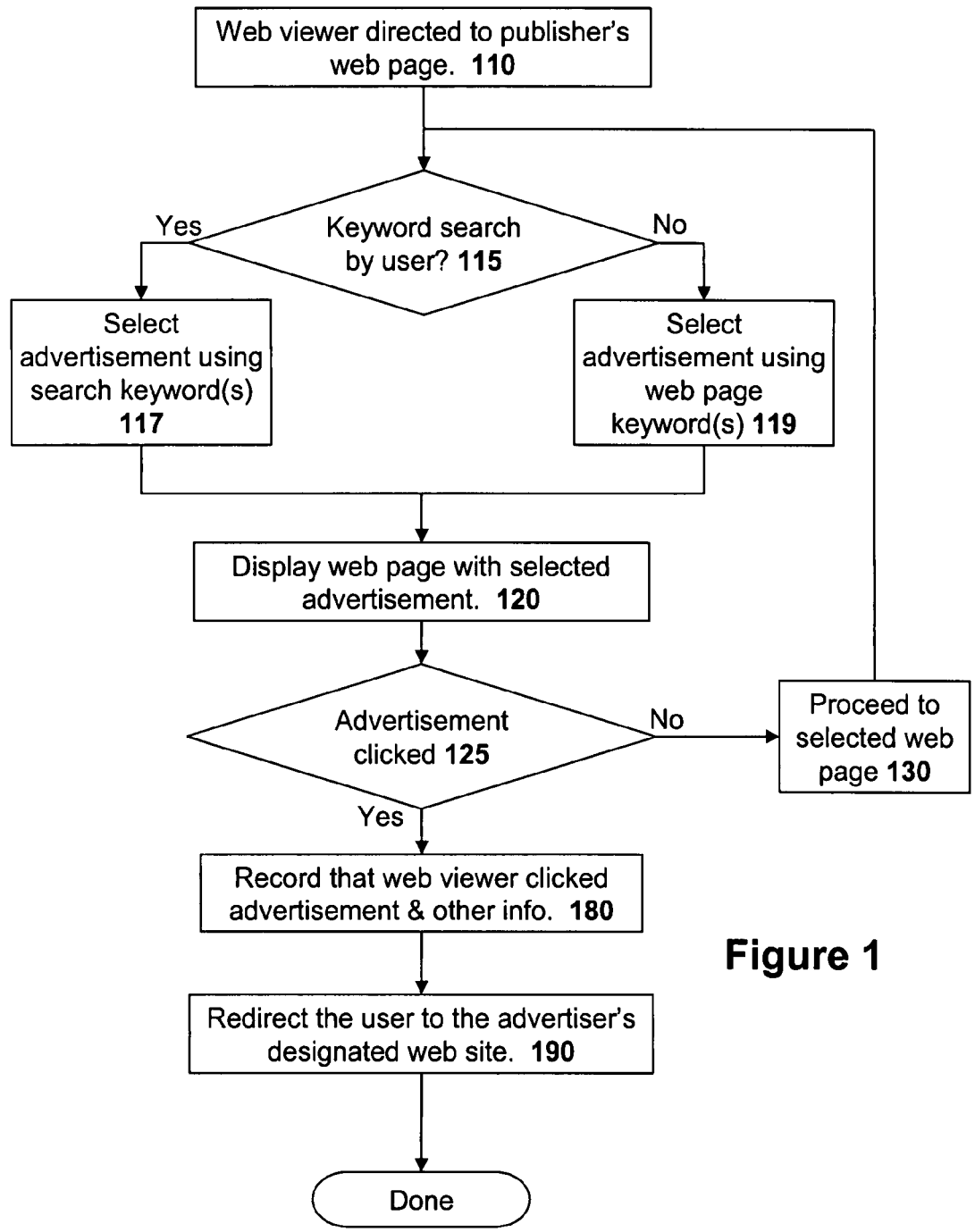
FIG. 1 presents one possible example of a simple Internet advertising system that attempts to select advertisements with a matching algorithm.

Due to the rise of the "pay-per-click" business model wherein Internet advertising services are only paid when a web viewer clicks on an advertisement, the Internet advertising services have attempted to select the advertisements most likely to attract the web viewer's attention. FIG. 1 presents one possible example of a simple Internet advertising system that attempts to select advertisements with a matching algorithm.

Referring to FIG. 1, a web viewer is directed to a web publisher's site at step 110. At step 115, the system determines if the web viewer was directed to the web page using a search keyword or not. If the web viewer was directed to the web page using a keyword search then the system may select an advertisement using one or more keywords from the web viewer's search as set forth in step 117. If the web viewer was directed to the web page by some means other than a keyword search, then the system may select an advertisement using one or more keywords from the web page as set forth in step 119. The publisher then displays the web page with the selected advertisement as set forth in step 120.

If the web viewer clicks on the selected advertisement at step 125, then the system records the web viewer's advertisement selection (in order to charge the advertiser for the click-through) at step 180 and then directs the web viewer to the advertiser's designate web site at step 190. Otherwise if the user did not select the advertisement back at step 125, then the system proceeds to the web page selected by the web viewer as set forth in step 130.

Simplistic advertisement matching systems such as the one presented in FIG. 1 have improved click-through rates by displaying advertisements that relate to what the web viewer was searching for or what the web viewer was reading on that web page. However, even better advertisement targeting systems could raise click through rates even higher.

Dynamic Personalized Internet Advertisement Creation

To improve click-through rates, the present invention proposes a system for dynamically creating customized Internet based advertisements. With the system of the present invention, additional factors are considered in order to better select an advertisement that likely catch the attention of the web viewer. Furthermore, the carefully selected advertisement is then customized for that particular web page and web viewer. With a sophisticated advertisement selection and customization system, the present invention can greatly improve click-through rates. A detailed description of the customized Internet advertisement system of the present invention will be presented with reference to FIGS. 2, 3, and 4.

Advertisement Template Creation

Figure 2:
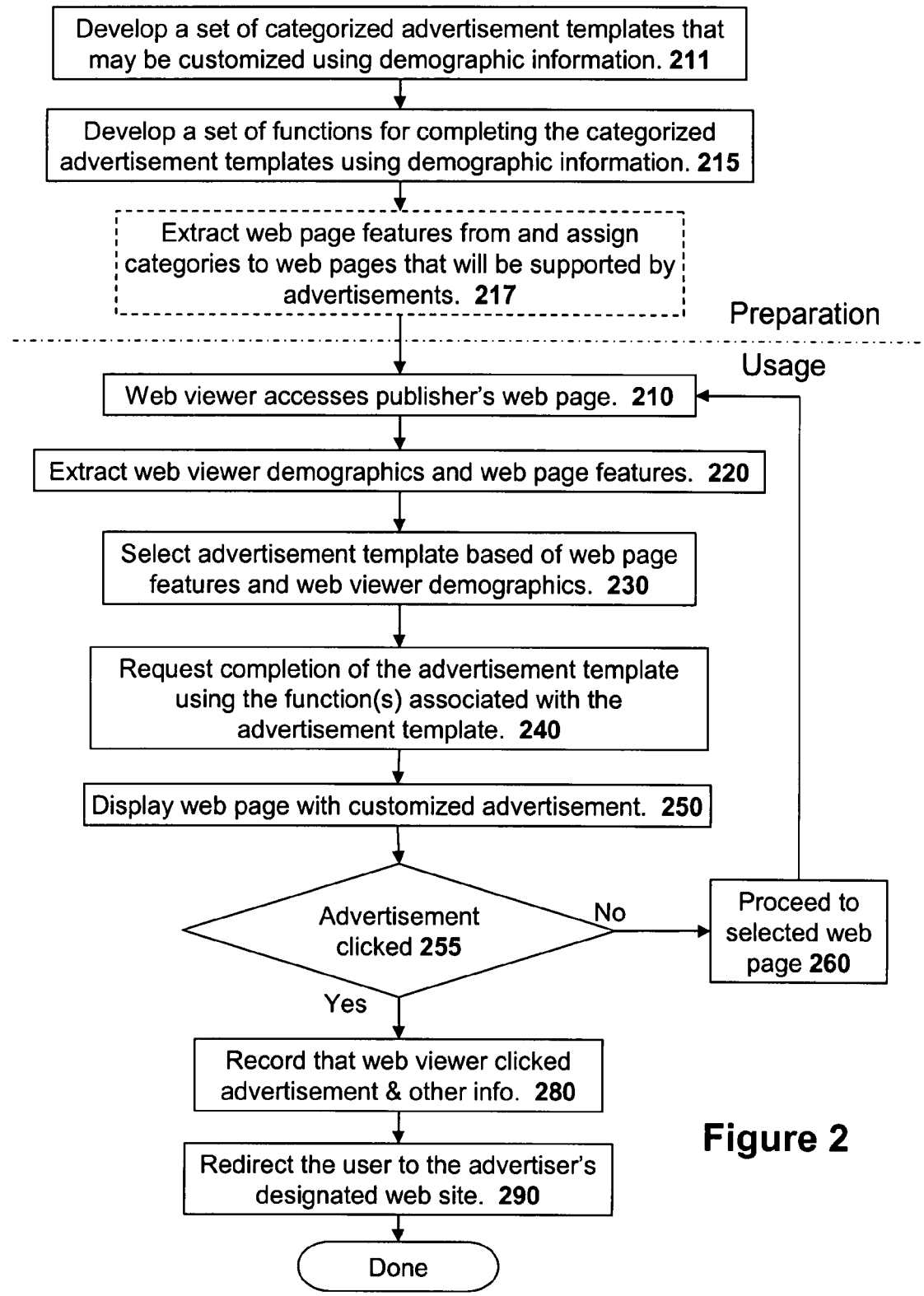
FIG. 2 illustrates a flow diagram that generally describes how the customized Internet advertisement system of the present invention operates.

FIG. 2 illustrates a flow diagram that generally describes how the customized Internet advertisement system of the present invention operates. The initial steps are preparations that must be done before the system may be used. Starting at step 211, one must first create a set of categorized advertisement templates. The advertising templates make take many different forms such as HTML code, JavaScript, or a simple custom code. This disclosure will present advertising templates with a simple psuedocode. Each advertising template may include sections that may be completed with information determined with a real-time function that is identified by the advertising template.

The functions identified within the advertising template may obtain information from many different sources. Simple standard functions may provide information such as the current time, known information about the web viewer such as the web viewer's IP address, etc. Other functions may be directed to a server run by the advertiser to provide specific real-time information from the advertiser about the advertisement. For example, a function may access the advertiser's server to obtain a current price for the product in the advertisement.

The functions may be combined in various different ways in order to provide more complex results. For example, with the nested functions "CountryofIP(WebViewerIP( ))" a first function obtains the web viewer's IP address and the second function obtains the user's country of origin using the IP address obtained from the first function.

Each advertising template is categorized in some manner such that the advertising templates may be intelligently selected to match the context of the web page. For example, a simple categorization scheme could draw from typical newspaper section organization such that there are NEWS, SPORTS, MOVIES, FINANCE, TECHNOLOGY, COOKING, and other similar categories. In an alternate embodiment, the categorization system could be driven by the types of advertisers that commonly advertise such as FINANCIAL SERVICES, RETAIL CLOTHING, REAL ESTATE, BUSINESS SOFTWARE, GAME SOFTWARE, MOVIES, AUTOMOBILES, etc.

In yet another embodiment, the categorization system could operate using keywords found in web page text or web viewer searches similar to the manner set forth in FIG. 1. Various categorization systems may be combined to narrow the focus of a particular advertising template. For example, a company that sells cookware may create an advertising template with a categorization of COOKING and also requires the keywords 'fried' or 'fry'. In this manner, the advertisement will appear in cooking stories that about fried foods but will not appear in a story about someone that 'fried' themselves while sunbathing or in a story about Fry's Electronics stores.

The examples of the preceding paragraph are just simple possibilities. The categorization system can be constructed to become quite complex in order to accurately target very specific desired potential customers. For example, a retailer of golf clubs may wish to target men that are age forty-five and older who are viewing web pages related to financial services or sports. Such a narrow categorization may be created since the categorization system is only limited by the information known about the web viewer and the web page that the web viewer is viewing. Thus, if age and sex information about a subset of web viewers has been collected, such a designation is possible. Note that advertisers should also specify whether a particular criterion is required or just desired. In this manner, if a particular piece of information is not available then an advertisement may still be used if the missing information is simply desired by not required.

To illustrate possible advertising templates, a few examples of internet templates are provided using a psuedocode. The first example illustrates an advertising template that is used to create a custom airfare text link advertisement TRAVEL and VACATION categories. The advertising template includes three variables that need to be filled in by functions.

---

(Template="Fly from <LocalAirport( )> to <Location( )> for <Fare( )>!", Categories('TRAVEL', 'VACATION'))

---

The first function 'LocalAirport( )' is used to determine the name or code of the local airport, the second function 'Location( )' is used to specify a location that is mentioned in the web page that the web viewer is viewing, and the final function 'fare( )' is used to determine an airline fare for traveling from the web viewer's local airport to the destination mentioned in the web page. Thus, if a web viewer that is known to live in the San Francisco bay area is viewing a web page that mentions Oslo, Norway, the customized advertising system of the present invention would create a text link advertisement that states "Fly from San Francisco's SFO to Oslo, Norway for $599!". The text link advertisement would include a link to a landing page that would allow the web viewer to book a flight to Oslo, Norway.

A second example presents an advertising template for cookware example presented earlier.

---

(Template="Buy Frying pans starting at <LowFryPanPrice( )>!", Categories('COOKING'), Keywords('fry', 'fried'))

---

The single function in the preceding advertisement template is used to obtain the lowest price of a frying pan offered by the advertiser. In this manner, when a web viewer is reading a recipe for fried chicken on a cooking web site the advertisement "Buy frying pans starting at $7.99!" will appear. But that advertisement will not appear if the web viewer is reading a movie review for the DVD of the movie "Fried Green Tomatoes".

Advertisement Function Creation

After creating advertisement templates, functions must be created in order to fill in the variable fields for the advertisement template as set forth in step 215. To simplify the creation of advertisement templates, an Internet advertising service may provide a large library of pre-created functions that can be used to fill in information that is known by the advertising service about the web viewer or the web page that is being viewed. Referring to the earlier airfare advertising template, the LocalAirport( ) function could be created by the advertising service to provide the local airport information using demographic information on the web page viewer or a geographic determination using the web viewer's IP address. The Location( ) function could be created by filling in the name of a geographic location that was extracted from the web page being viewed by the web viewer. The fare( ) function would need to be provided by the airline or travel service that wishes to advertise airfares.

Offline Web Page Feature Extraction

Referring back to FIG. 2, the next preparation step is to extract features from the web pages that will be advertising supported as set forth in step 217. This step is illustrated with a dashed box since it is not necessary to perform feature extraction on the web pages at this point, feature extraction may be performed in real-time. However, by performing feature extraction on web pages before the advertisements are needed, a higher-quality of feature extraction may be performed.

The feature extraction step processes a web page in order to identify unique keywords from the web page and categorize the web page if no categorization has been provided by the web page's creator. It may be desirable to identify and extract various classes of features from each web page that are known to be useful for advertisers. The extracted features may include things such as location names, sports team names, celebrity names, automobile names, famous trademarks, company names, event names, etc. These extracted features can be used to assign categories to the web page. For example, a feature extraction engine may extract the features "Rumsfeld", "Bush", and "Iraq" from a web page such that it assigns the category 'NEWS' to the web page. As is apparent to one skilled in the art, off-line feature extraction and categorization is desirable since the lack of time constraints would allow the feature extraction and categorization system to create thorough and accurate feature lists and categorizations for each web page.

Dynamic Personalized Internet Advertisement Usage

Referring back to FIG. 2, steps 210 and beyond describe how the internet advertising templates and related functions are used to dynamically create customized advertisements for web viewers. The usage steps of FIG. 2 will be presented with reference to conceptual diagram FIG. 3 which illustrates the communication between various computer systems.

Web Page Request

Initially, at step 210 a web viewer accesses a publisher's advertising supported web page. This is conceptually illustrated as arrow 311 from a web viewer's personal computer 310 to the web site publisher's server 320 across the Internet 300. At this point, the web site publisher's server 320 requests a customized advertisement from an advertising service server 330 as designated with arrow 321. The web site publisher's server 320 passes along information known about the web viewer and the web site page that was requested by the web viewer. For example, if the web site publisher has user registrations, then the web site publisher should pass along all the demographic information it has available about the web viewer from their web viewer registration database 329. With regard to the web site page, the web site publisher may pass certain feature information or simply pass an address to the web page source code such that the advertising service center can do its own analysis of the web page that is being accessed by the web viewer Web Page Feature and Web Viewer Demographics Extraction Referring back to FIG. 2, the advertising service server then attempts to extract web viewer demographics about the web viewer and features from the web page. As previously described, feature extraction from the web page may have been performed off-line as set forth in step 220. In such an embodiment, those pre-extracted features & categories are simply retrieved. Otherwise, the system performs a quick feature extraction. This may be helped if the creator of the web page includes meta-data tags that describe the content and includes keywords.

Web viewer demographics may be extracted from web browser cookies, the web viewer's IP address, and any other information immediately available from the web viewer's web page request. Additionally, the web viewer may have registered with a web site earlier and given some information that can be retrieved from a web viewer demographics database 339 as illustrated in FIG. 3.

Customized Advertisement Template Selection

After obtain detailed feature information about the web viewer and the web page requested by the web viewer, the system proceeds to step 230 in order to select an advertisement template. The selection of the advertisement template can be performed by examining the criteria of the available advertisements and attempting to select the best advertisement template for that web viewer and that web page. As set forth earlier, selection of an appropriate advertisement may be performed using any combination of the web page feature and web viewer demographic information available.

If a particular piece of web page feature or web viewer demographic information is not available then default information may be used instead of the needed information. For example, with the advertising template "Fly from <LocalAirport( )> to <Location( )> for <Fare( )>!", the system may have all of the web viewer's information except for the web viewer's local airport. In such a situation, the system could insert the default information and a default function result. In that situation, the default information could be "anywhere in the USA" and the default answer could be "a low price" such that the resulting string would be "Fly from anywhere in the USA to Oslo for a low price!". However, if piece of web page feature or web viewer demographic information that is not available is absolutely needed for a particular advertisement template then that advertisement template will not be selected.

The advertisement template selection may be prioritized in a manner to provide the most customized advertisement. For example, if there are two applicable advertisement templates but default information would be required to complete one of the advertisement templates, then the system may opt to select that advertisement template that does not use any default information since that advertisement template will provide a more customized advertisement. Relative priorities may be established such that advertisements that use more function fields that provide customized information take priority over advertisements that use less customized fields.

Advertisement Template Completion

After selecting a particular advertising template to display, the advertising template must be completed with the customized information as set forth in step 250. This is performed by accessing the functions need to fill the variable fields. As set forth with the following airfare advertisement template, three functions must be called: LocalAirport( ), Location( ), and Fare( ).

---

(Template="Fly from <LocalAirport( )> to <Location( )> for <Fare( )>!", Categories('TRAVEL', 'VACATION')

---

With this example, the first two functions may be handled by the advertising service. The LocalAirport( ) function may be handled by first performing a geographic database look-up based upon the web viewer's IP address to obtain the web viewer's geographic location and then performing an airport database look-up to find the closest major airport to the web viewer's location. The location( ) function simply returns the name of a geographic location that was extracted as a web page feature used to select this airfare advertisement template. For example, the web viewer may have been viewing a travel web page about Oslo, Norway such that feature 'Oslo' was extracted from the web page and used as a keyword criteria to select the advertisement web page since the airline advertiser services Oslo, Norway.

The final function, fare( ), is for airfare information that cannot be known by advertising service since it changes over time. Referring to FIG. 3, to handle the fare( ) function, the advertising service web server 330 makes a request 331 to the advertiser's server 340 that requests the airfare for a flight from the web viewer's local airport (determined with the LocalAirport( ) function) to the destination that the web viewer was reading about (determined by the Location( ) function). The airfare response 333 is returned to the advertising service server 330 such that the customized advertisement can be completed.

In addition to returning the airfare, the advertising server 340 may also return a link to a 'landing page' to be accessed if the web viewer wishes to learn more about or purchase the flight. The completed customized advertisement (including the link to the landing page) is then returned to the web page publisher in response 323.

Referring back to FIG. 2, the completed advertisement is displayed to the web viewer. This is done by having the web site publisher server 320 return the completed requested web page that includes the customized advertisement to the web viewer in response 313.

If the web viewer clicks on the custom advertisement at step 255, then the system records the web viewer's advertisement selection (in order to charge the advertiser for the click-through) at step 280. Next, at step 290, the system directs the web viewer to the web site that the advertiser supplied when the advertiser responded to a function needed to complete the customized advertisement. If the user did not select the customized advertisement back at step 255, then the system proceeds to the web page selected by the web viewer as set forth in step 260.

Other Applications for Personalized Internet Advertisement

It is important to emphasize that although the teachings of the present invention are presented in the context of advertisements for World Wide Web pages, the teachings of the present invention can be used in any other digital network advertising system. The primary requirements are the ability to select an advertisement template depending on the viewer's current circumstances and then the ability to populate the advertising template with specific information targeted at the viewer. This double-targeting system may be used in many different environments.

For example, the teachings of the present invention may be used by a company that develops and freely distributes an internet communication application that allows Internet web viewers to communicate by voice or any other manner for free or at low cost. To provide additional revenue to the company, the company could display targeted advertisements on the display screens of the users that use the internet communication application. With such a system, the techniques of the present invention could be used to dynamically create personalized advertisements that will be displayed in the internet communication application's window. For example, the system could use the Internet Protocol addresses of the users to determine the geographic locations of two Internet users that are communicating using the communication application. The system could then use that geographic location information to create relevant advertisements for the users' locations. For example, the system could offer flights from the location of one of the users to the location of the other user with an advertisement such as "Visit your friend in Tulsa, Okla. for $299!".

Similarly, the teachings of the present invention may be used within advertisements contained in a videogame. There may be a plethora of information about the videogame player that is present on the videogame console such as the player's name, address, games played, age, etc. For example, the avatar of a videogame player may access a kiosk within a videogame in order to obtain clues to complete the game. The kiosk within the videogame could then display a customized advertisement that has been customized for the videogame player using the information obtained from the videogame console. If the videogame player selects the advertisement displayed on the kiosk in the game, the videogame may save its current game state information and then launch a web browser on the videogame console and direct the web browser to the advertisers web real world web site! Similarly, billboards in the videogame world could be customized to appeal to the player of the videogame. A billboard in the videogame may read "Visit your local Game shack at 123 Elm Street."

The foregoing has described a number of techniques for dynamically creating customized electronic advertisements. It is contemplated that changes and modifications may be made by one of ordinary skill in the art, to the materials and arrangements of elements of the present invention without departing from the scope of the invention.

We claim:

1. A computer-implemented method of displaying an advertisement on a Web page, the method comprising:
    receiving, by a server, information that a Web viewer accesses a Web page;
    receiving, by a server, at least one keyword from the Web page;
    receiving, by a server, a category of the Web page describing a context of the Web page, wherein the category is assigned to the Web page based on the at least one keyword of the Web page;
    receiving, by a server, demographic information about a Web viewer of the Web page;
    selecting, by a server, an advertisement template from at least one applicable advertisement template based on the demographic information of the Web viewer, wherein the advertisement template comprises:
        an advertisement with missing information, wherein the missing information is associated with the demographic information of the Web viewer and a product or service that the advertisement promotes;
        a template keyword matching the at least one keyword of the Web page; and
        a template category matching the category of the Web page;
    inserting, by a server, the missing information into the advertisement; and
    delivering, by a server, the advertisement to the Web page.

2. The computer-implemented method according to claim 1, wherein the demographic information comprises at least one of an IP address of the Web viewer, a Web page request of the Web viewer, information saved in a Web browser cookie of an electronic device of the Web user, and information provided by the Web viewer when the Web viewer registered with a website.

3. The computer-implemented method according to claim 1, wherein receiving the at least one keyword from the Web page is performed off-line.

4. The computer-implemented method according to claim 1, wherein receiving the at least one keyword from the Web page is performed in real-time when a request is made for the Web page.

5. The computer-implemented method according to claim 1, further comprising assigning default information to the missing information when no demographic information of the user is associated with the missing information of the advertisement.

6. The computer-implemented method according to claim 1, wherein selecting the advertisement template from at least one applicable advertisement template comprises:
    assigning, by a server, a higher selection priority to a first advertisement template when the at least one applicable advertisement template comprises:
        the first advertisement template, wherein the first advertisement template does not require the default information; and
    a second advertisement template that requires the default information.

7. The computer-implemented method according to claim 1, wherein the advertisement template further comprises a function to insert the missing information of the advertisement.

8. A computer-implemented method of performing electronic advertising to an electronic device of a user, the method comprising:
    receiving, by a server, information that an interface is shown on a screen of an electronic device, wherein the server is in communication with the electronic device;
    receiving, by a server, at least one keyword from the interface;
    receiving, by a server, a category of the interface describing a context of the interface, wherein the category is assigned to the interface based on the at least one keyword of the interface;
    receiving, by a server, demographic information about the user of the electronic device;
    selecting, by a server, an advertisement template from at least one applicable advertisement template based on the demographic information of the user, wherein the advertisement template comprises:
        an advertisement with missing information associated with the demographic information of the user and a product or service that the advertisement promotes;
        a template keyword matching the at least one keyword of the interface; and
    inserting, by a server, the missing information into the advertisement; and
    delivering, by a server, the advertisement to the electronic device.

9. The computer-implemented method according to claim 8, wherein
    the interface is an interface of a videogame;
    the electronic device comprises a videogame console; and
    the demographic information comprises information about the user stored on the console.

10. The computer-implemented method according to claim 8, wherein the interface of the electronic device is at least one of a Web page, an interface of a videogame, an interface of a voice communication application.

11. The computer-implemented method according to claim 8, further comprising assigning default information to the missing information when no demographic information of the user is associated with the missing information of the advertisement.

12. The computer-implemented method according to claim 8, wherein selecting the advertisement template from at least one applicable advertisement template comprises:
    assigning, by a server, a higher selection priority to a first advertisement template when the at least one applicable advertisement template comprises:
        the first advertisement template, wherein the first advertisement template does not require the default information; and
        a second advertisement template that requires the default information.

13. The computer-implemented method according to claim 8, wherein the advertisement template further comprises a function to insert the missing information of the advertisement.

14. A system, comprising a server in communication with an electronic device of a user via a network, the server being configured to:
- receive information that an interface is shown on a screen of the electronic device:
- receive at least one keyword from the interface;
- receive a category of the interface describing a context of the interface, wherein the category is assigned to the interface based on the at least one keyword of the interface;
- receive demographic information about the user;
- select an advertisement template from at least one applicable advertisement template based on the demographic information of the user, wherein the advertisement template comprises:
  - an advertisement with missing information associated with the demographic information of the user and a product or service that the advertisement promotes;
  - a template keyword matching the at least one keyword of the interface; and
  - a template category matching the category of the interface;
- insert the missing information into the advertisement; and
- deliver the advertisement to the interface of the electronic device.

15. The system according to claim 14, wherein
the interface is an interface of a videogame,
the electronic device comprises a videogame console, and
the demographic information comprises information about the user stored on the console.

16. The system according to claim 14, wherein the demographic information comprises at least one of an IP address of the electronic device, information saved in a Web browser cookie of the electronic device, an interface request from the user, and information provided by the user when the user registered with a website.

17. The system according to claim 14, wherein the interface of the electronic device is at least one of an interface of a voice communication application and a Web page.

18. The system according to claim 14, wherein the server is further configured to assign default information to the missing information when no demographic information of the user is associated with the missing information of the advertisement.

19. The system according to claim 18, wherein to select the advertisement template from the at least one applicable advertisement template, the server is further configured to assign a higher selection priority to a first advertisement template when the at least one applicable advertisement template comprises:
- the first advertisement template, wherein the first advertisement does not require the default information; and
- a second advertisement template that requires the default information.

20. The system according to claim 18, wherein the advertisement template further comprises a function to insert the missing information of the advertisement.

* * * * *